United States Patent

Hayakawa

[11] Patent Number: 6,046,782
[45] Date of Patent: Apr. 4, 2000

[54] COLOR IMAGE DISPLAY APPARATUS USING ROTARY COLOR FILTERS AND FIELD MEMORIES

[75] Inventor: Masaharu Hayakawa, Nagaokakyo, Japan

[73] Assignee: Mitsubishi Denki Kabushiki Kaisha, Tokyo, Japan

[21] Appl. No.: 08/134,866

[22] Filed: Oct. 12, 1993

Related U.S. Application Data

[63] Continuation of application No. 07/966,853, Oct. 27, 1992, abandoned.

[30] Foreign Application Priority Data

Oct. 29, 1991 [JP] Japan .................................. 3-282566

[51] Int. Cl.[7] .................................................. H04N 9/12
[52] U.S. Cl. ........................................................ 348/742
[58] Field of Search ................................ 358/58, 60, 64,
358/253, 1, 56, 36, 11; 348/742, 743, 744,
745, 776, 781; H04N 9/12, 9/14, 9/16,
9/43, 9/04

[56] References Cited

U.S. PATENT DOCUMENTS

| | | | |
|---|---|---|---|
| 2,339,256 | 1/1944 | Doncaster | 358/58 |
| 2,416,919 | 3/1947 | Goldsmith | 358/58 |
| 3,272,506 | 9/1966 | Lescher | 358/56 |
| 3,821,796 | 6/1974 | Ernstoff et al. | |
| 4,394,681 | 7/1983 | Rowe | 358/60 |
| 4,758,884 | 7/1988 | Roy | 358/56 X |

FOREIGN PATENT DOCUMENTS

| | | | |
|---|---|---|---|
| 2538203 | 12/1982 | France | H04N 5/74 |
| 0932132 | 8/1955 | Germany | 348/743 |
| 5916482 | 1/1984 | Japan | H04N 9/04 |
| 1262745 | 10/1986 | U.S.S.R. | H04N 9/120 |

OTHER PUBLICATIONS

"Television" (pp. 376–379) F. Kerkhof & W.Werner. Pub. 1952.
"Television Art" (pp. 92–97 Yoshizawa et al—May 1964.

Primary Examiner—Safet Metjahic

[57] ABSTRACT

In a color image display apparatus, a coloring unit consisting of a plurality of color filters is disposed confronting to the display face of a monochrome image display unit. When the color filters are sequentially faced to the display face as the coloring unit is rotated, video signals of the color signals corresponding to the respective color filters are inputted and stored in a plurality of video signal storage units, and the stored video signals are selected by a signal switching device and outputted to the image display unit, whereby a color image is displayed.

8 Claims, 12 Drawing Sheets

COLOR IMAGE DISPLAY APPARATUS USING ROTARY COLOR FILTERS AND FIELD MEMORIES

This application is a continuation of application Ser. No. 07/966,853 filed on Oct. 27, 1992, now abandoned.

BACKGROUND OF THE INVENTION

1. Field of the Invention

This invention relates to a color image display apparatus which is provided with color filters in front of a display face of a monochrome image display unit such as a black-and-white cathode ray tube thereby to display a color image.

2. Description of Related Art

Figure 1:
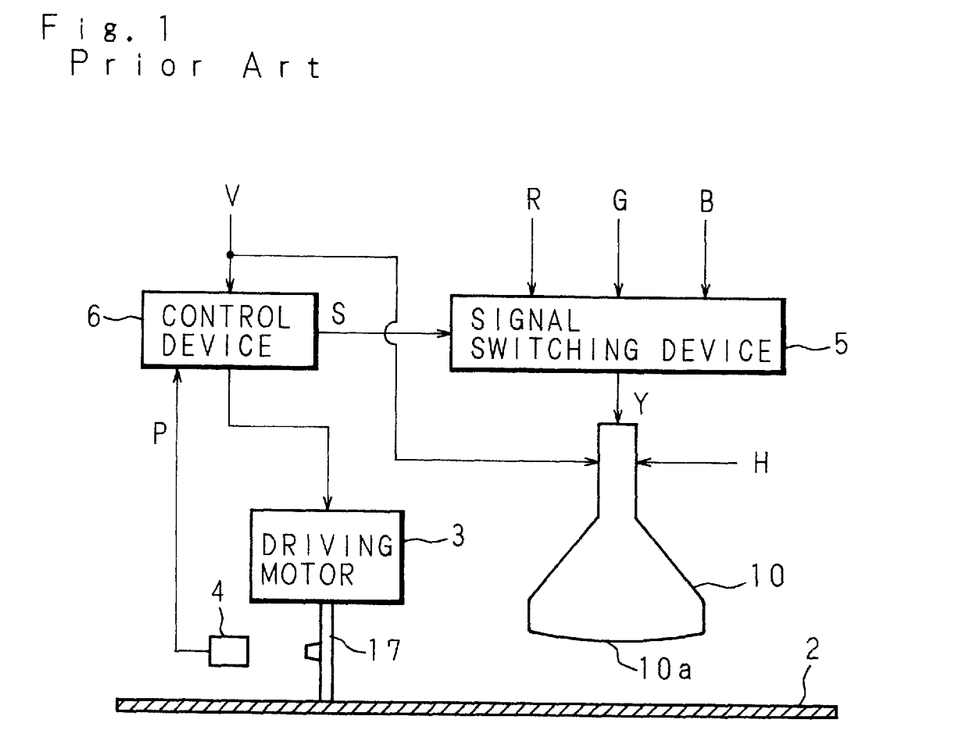
FIG. 1 is a schematic structural diagram of a conventional color image display apparatus.
Figure 2:
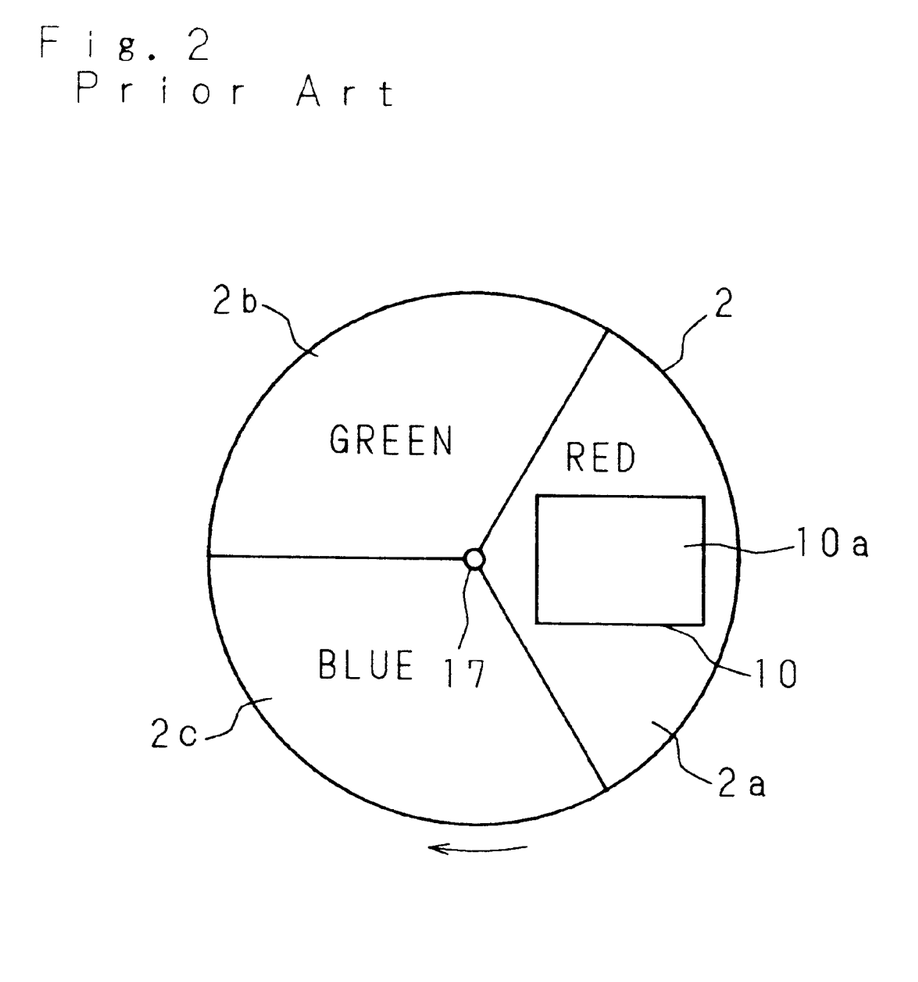
FIG. 2 is a front elevational view of the conventional color image display apparatus.
Figure 3A:
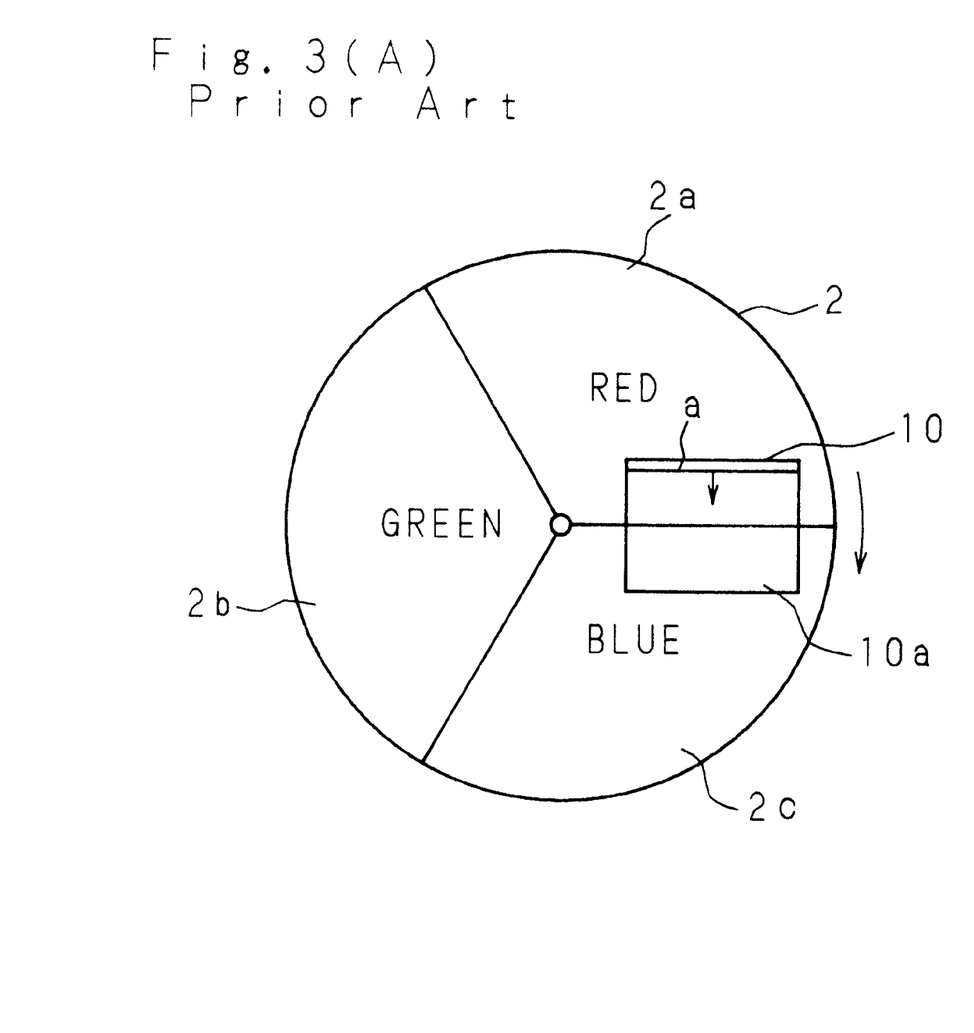
FIGS. 3(A), 3(B), 4(A), 4(B), 5(A) and 5(B), are diagrams explanatory of the relationship between the rotational phase of a coloring unit and a scanning line on a display face of an image display unit at the time of a red display.
Figure 3B:
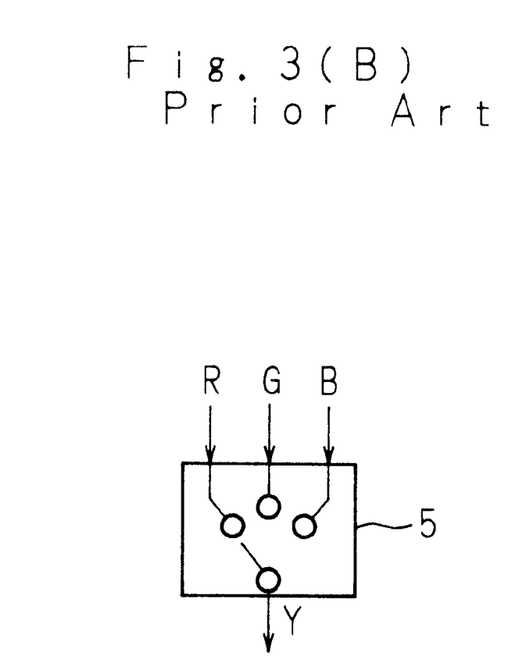
Figure 4A:
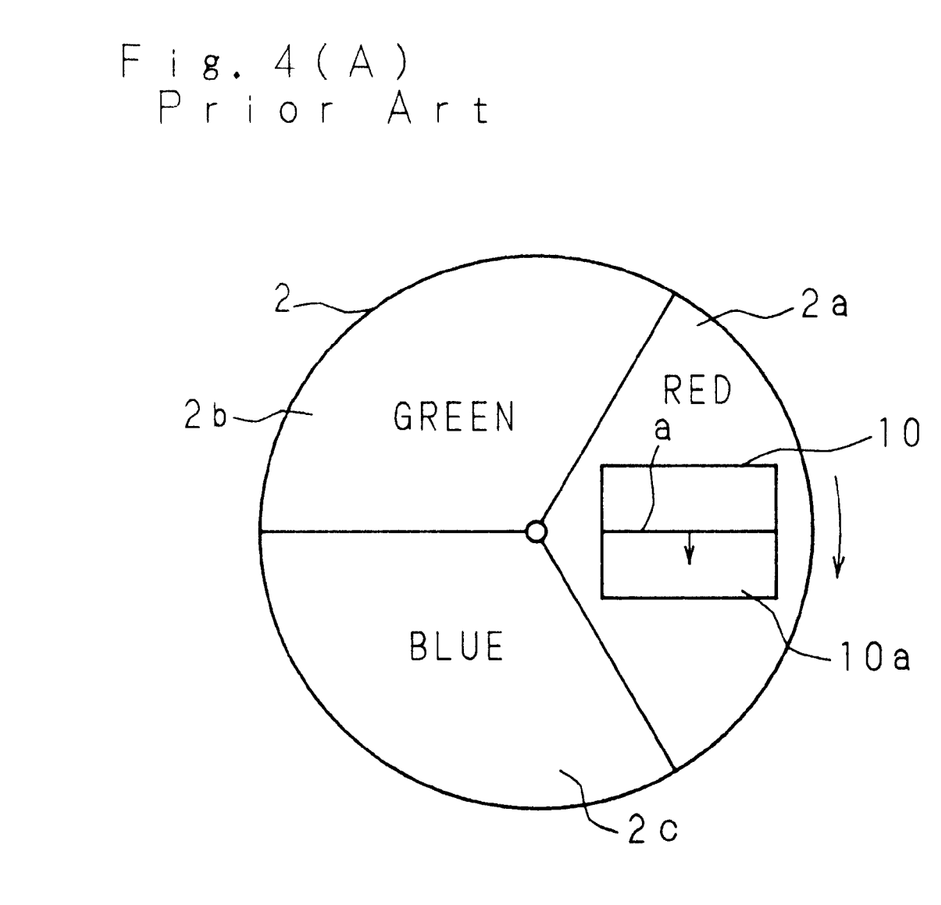
Figure 4B:
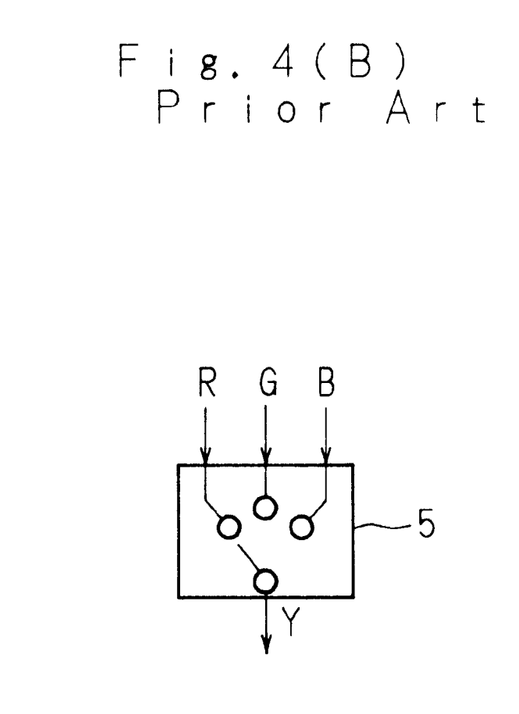
Figure 5A:
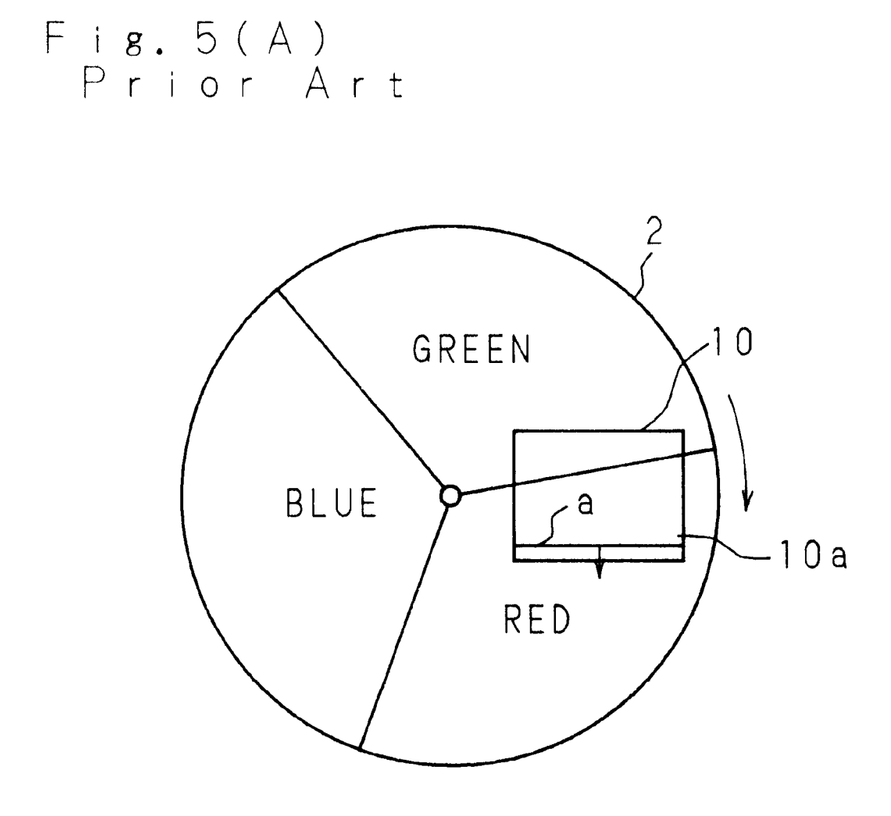
Figure 5B:
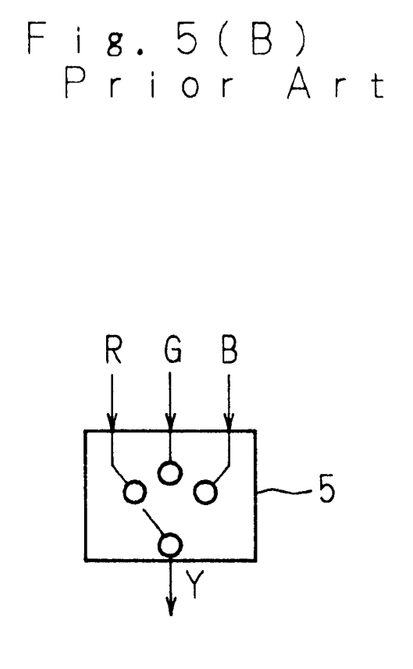
Figure 6A:
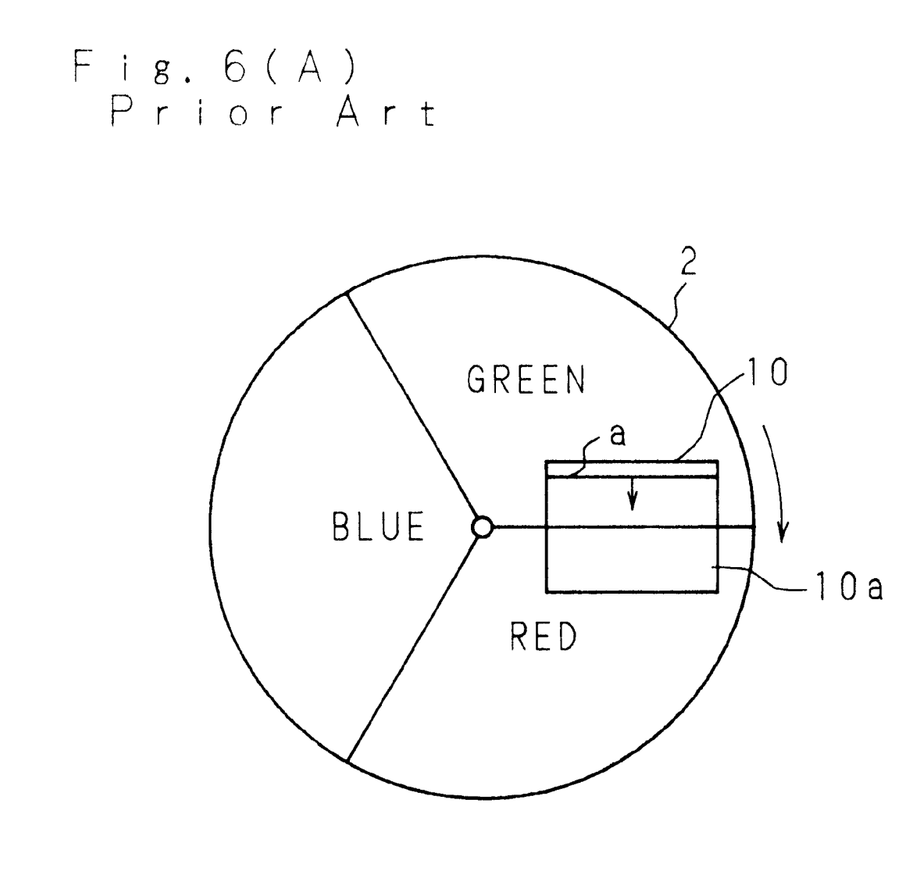
FIGS. 6(A) and 6(B) are diagrams explanatory of the relationship between the rotational phase of the coloring unit and a scanning line on the display face of the image display unit at the switching time from a red display to a green display.
Figure 6B:
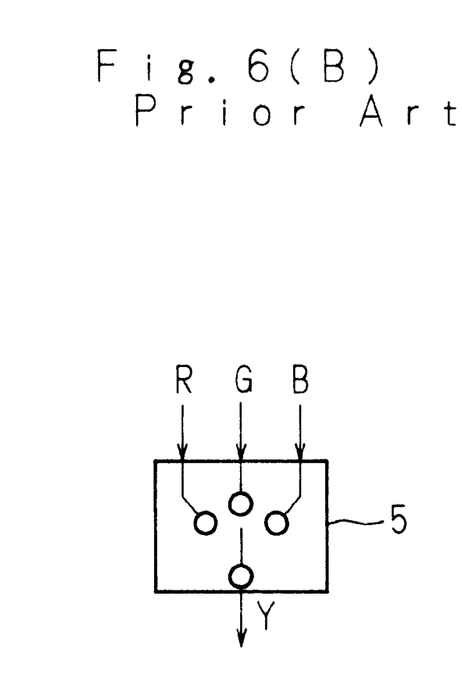

FIG. 1 is a schematic structural diagram of a conventional color image display apparatus using color filters. Referring to FIG. 1, a monochrome image display unit 10 of, for example, a cathode ray tube (CRT) displays a monochromic image onto a display face 10a based on a luminance signal Y, a horizontal synchronizing signal H and a vertical synchronizing signal V. A coloring unit 2 is arranged confronting to the display face 10a of the image display unit 10. The coloring unit 2 is a disk-shaped member as shown in FIG. 2, in which three color filters 2a, 2b, 2c, e.g., red (R), green (G) and blue (B) filters with equal area are successively arranged around a rotary shaft 17. The color filters 2a, 2b, 2c are so set as to sequentially be in front to the display face 10a of the image display unit 10, and driven around the rotary shaft 17 by a rotary driving device, for example, a driving motor 3.

In the vicinity of the rotary shaft 17 is provided a rotation detector 4 which detects the rotational phase of the coloring unit 2. The rotation detector 4 generates a rotational synchronization pulse P of the coloring unit 2 to a control device 6. In consequence, the control device 6 controls the driving motor 3 based on the rotational synchronization pulse P and the vertical synchronizing signal V, with outputting a switching signal S to a signal switching device 5. The signal switching device 5 having inputs of color signals R, G, B corresponding to the respective color filters 2a, 2b, 2c selects and outputs one of the color signals R, G, B for every input of the switching signal S to the image display unit 10.

The operation of the conventional color image display apparatus in the structure as depicted hereinabove will be discussed now. Upon receipt of the vertical synchronizing signal V the frequency of which is demultiplexed to ⅓ and the rotational synchronization pulse P of the coloring unit 2, the control device 6 controls the driving motor 3 so as to maintain a predetermined phase relation, thus eventually controlling the rotation of the coloring unit 2 around the rotary shaft 17 in a direction of an arrow (with reference to FIG. 2). The coloring unit 2 is consequently rotated ⅓ for one field of the input video signal. If the phase relation is set so that the lower half of, for instance, the red color filter 2a is positioned at the uppermost end of the image display unit 10 with the timing of the vertical synchronizing signal V, the coloring unit 2 can be rotated to position the red color filter 2a on the scanning line at all times in accordance with the advancement of the scanning line from the upper to lower portion on the display face 10a of the image display unit 10.

In the meantime, the switching signal S is outputted from the control device 6 to the signal switching unit 5 every time the vertical synchronizing signal V is inputted to the control device 6. As a result, the signal switching unit 5 outputs a signal corresponding to the color of the color filter 2a, 2b or 2c facing the display face 10a of the image display unit 10 every time the switching signal S is input thereto. The control operation will be shown in time sequence in FIGS. 3–6. FIGS. 3(A), 4(A), 5(A) and 6(A) indicate the relationship between the rotational phase of the coloring unit 2 and a scanning line (a) on the display face 10a of the image display unit 10. FIGS. 3(B), 4(B), 5(B) and 6(B) represent the state of the signal switching unit 5 corresponding to the respective FIGS. 3(A), 4(A), 5(A) and 6(A). Although FIGS. 3–6 are related to the case of a red display and the change from a red display to a green display, the same goes true for the green display and blue display. Since the scanning line (a) is enough to be accommodated within the area of each color filter 2a, 2b, 2c, the rotational phase of the coloring unit 2 does not need to be very accurate.

While the coloring unit 2 makes one rotation, the image display unit 10 sequentially displays red (R), green (G) and blue (B) video signals for every field. At this time, also the color filters 2a, 2b, 2c of the coloring unit 2 are sequentially facing to the display face 10a of the image display unit 10, and therefore, a color image in three colors is obtained with the screen of three fields for one rotation of the coloring unit 2.

Because of the above-described structure of the conventional color image display apparatus, video signals for three fields are necessitated to obtain a piece of a color image. In the case of a pattern on components close to primary colors, only one field of the three fields is displayed, thus generating undesired flicker.

Meanwhile, there has been proposed to use a color CRT of a shadow mask type or to combine images of three monochromic CRTs by means of a dichroic mirror etc. The former method is disadvantageous in that the resolution is decreased to ⅓ of a black-and-white CRT since three colors are decomposed when displayed on the same CRT. According to the latter method, since it is necessary to adjust the position of the three CRTs with high accuracy, manufacturing of the display apparatus is difficult and moreover, manufacturing costs are high because of the need of a highly accurate dichroic mirror in addition to the three CRTs.

SUMMARY OF THE INVENTION

A main object of this invention is to provide a color image display apparatus capable of displaying a color image with high resolution without accompanying flickers by the use of a monochrome image display unit and a coloring unit.

A further object of this invention is to provide a compact color image display apparatus without requiring highly accurate positioning of parts.

A color image display apparatus of this invention is provided with a plurality of video signal storage units for temporarily storing respective color signals, wherein the signal stored in the storage units is sequentially outputted to a monochrome image display unit, so that three, red, green and blue images are displayed within a predetermined field period of the input video signal. Accordingly, one color image can be displayed, for example, in a period of one field, thus achieving a high-quality color image without flicker.

The above and further objects and features of the invention will more fully be apparent from the following detailed description with accompanying drawings.

DESCRIPTION OF THE PREFERRED EMBODIMENTS

Now, preferred embodiments of this invention will be depicted in a detailed manner with reference to the accompanying drawings.

(First Embodiment)

Figure 7:
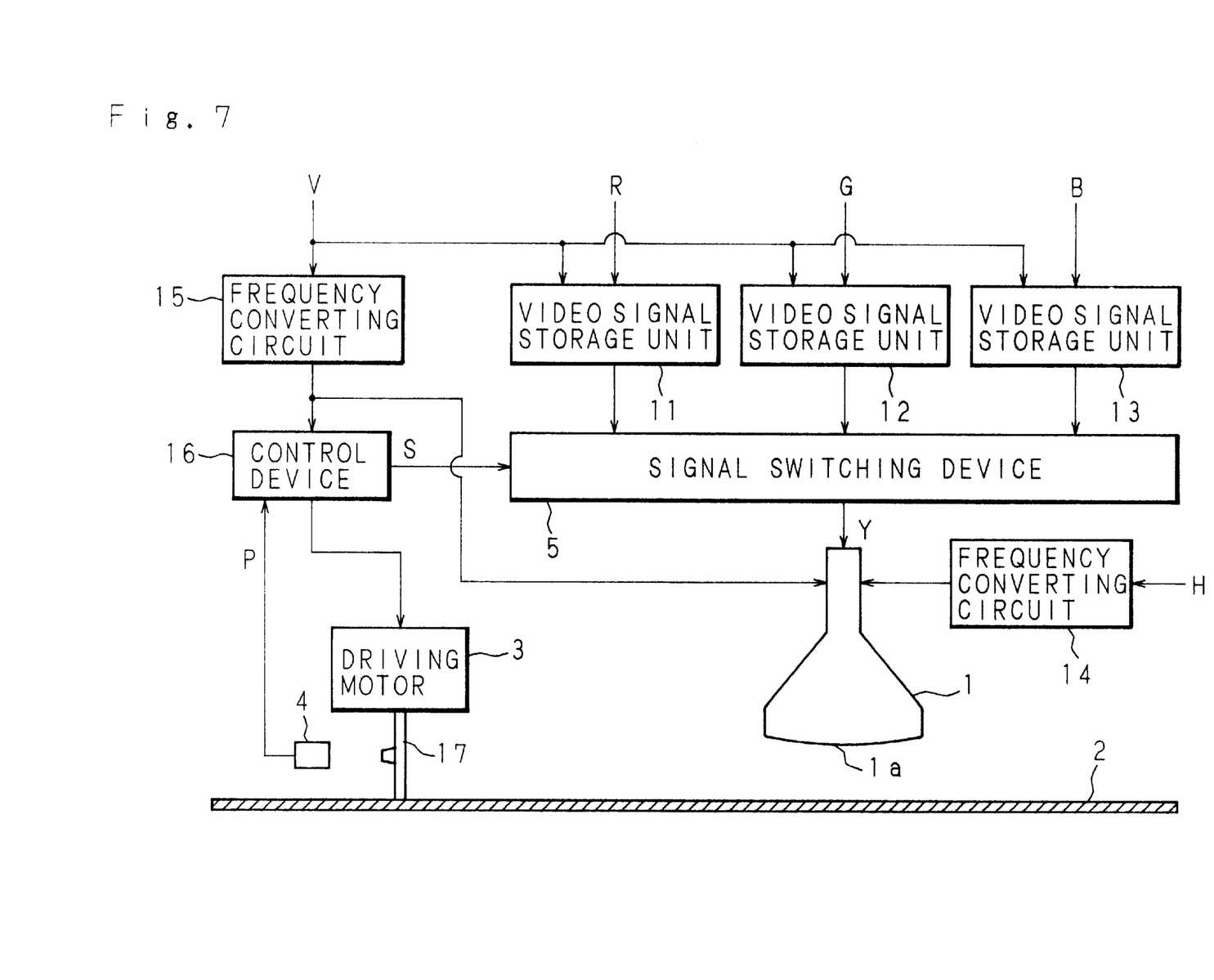
FIG. 7 is a schematic structural diagram of a color image display apparatus according to a first embodiment of this invention.

FIG. 7 schematically shows the structure of a color image display apparatus according to a first embodiment of this invention. In FIG. 7, a monochrome image display unit 1 which is constituted of, for example, a cathode ray tube (CRT) displays a black-and-white image onto a display face 1a thereof based on the output signals from a frequency converting circuit 14 and a frequency converting circuit 15 and a luminance signal Y from a signal switching device 5. The frequency converting circuit 14 converts a horizontal synchronizing signal H to a signal of the frequency three times the original, while the frequency converting circuit 15 converts a vertical synchronizing signal V to a signal of the frequency three times the original. Therefore, the image display unit 1 of this invention displays the black-and-white image the vertical scanning frequency and the horizontal scanning frequency of which are multiplied three times as compared with the image display unit 10 of the prior art.

Figure 8:
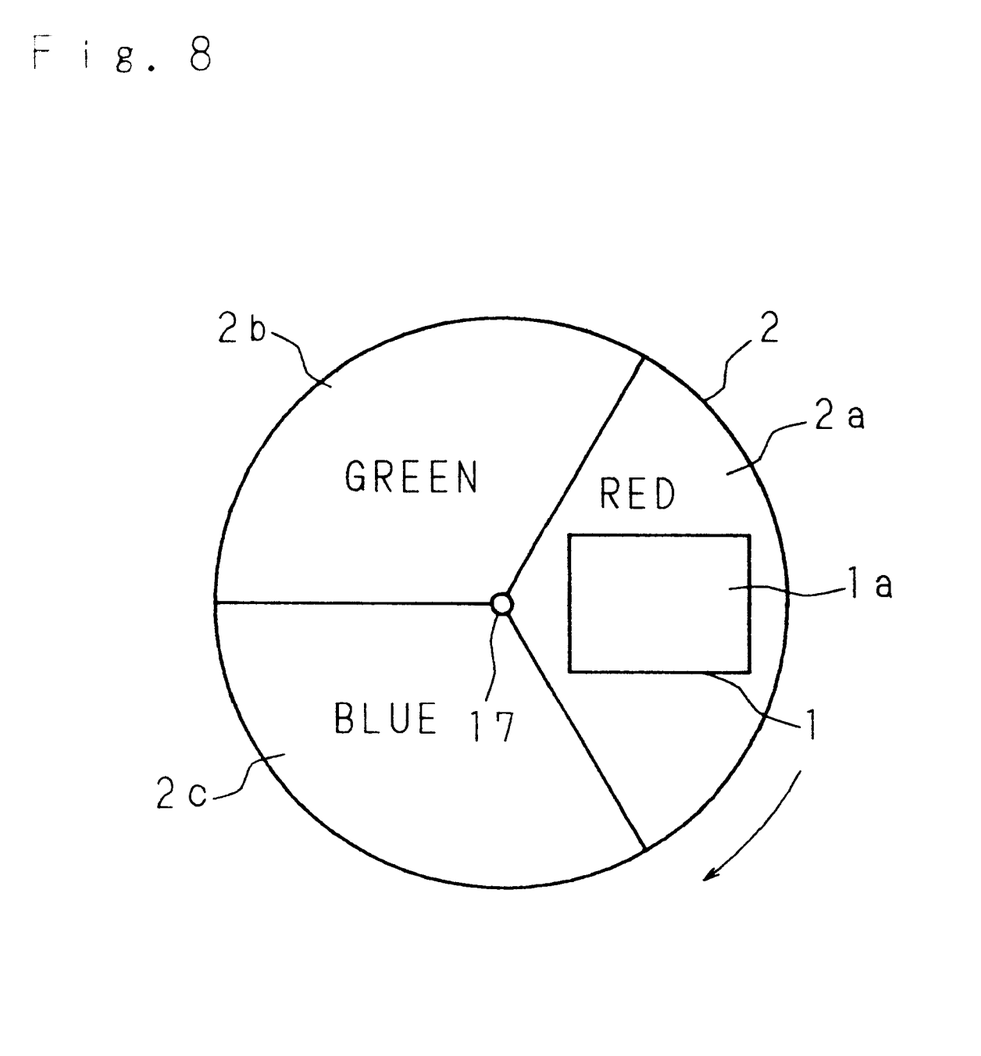
FIG. 8 is a front elevational view of the color image display apparatus of FIG. 7.

A color unit 2 is faced toward the display face 1a of the image display unit 1. As shown in FIG. 8, the color unit 2 is a disk-shaped member having three color filters 2a, 2b and 2c, for example, red (R), green (G), and blue (B) filters of the equal size successively arranged around a rotary shaft 17. These color filters 2a, 2b, 2c are arranged so as to sequentially face the display face 1a of the image display unit 1, and rotate around the rotary shaft 17 by a rotary driving device such as a driving motor 3 or the like.

The rotational phase of the above coloring unit 2 is detected by a rotation detector 4 installed in the vicinity of the rotary shaft 17. The rotation detector 4 outputs a rotational synchronization pulse P of the coloring unit 2 to a control device 16. The control device 16 not only controls the driving motor 3, but outputs a switching signal S to a signal switching device 5 in accordance with the rotational synchronization pulse P and the vertical synchronizing signal V. Video signal storage units 11, 12, 13 store inputs of color signals R, G, B of one field in synchronism with the input vertical synchronizing signal V. Each video signal storage unit 11, 12, 13 repeats three times to output the stored video signal with the speed three times the input speed to the signal switching device 5. The video signal storage units 11–13 used in the instant embodiment are dual port memories. Every time the switching signal S is inputted to the signal switching device 5, the signal switching device 5 selects a color signal R, G, B corresponding to the red, green or blue color filter 2a, 2b or 2c, and outputs the color signal to the image display unit 1.

The operation of the color image display apparatus in the above-described structure will be described hereinbelow.

Each video signal storage unit 11, 12, 13 stores color signals R, G, B of one field in synchronism with the input vertical synchronizing signal V. Moreover, each video signal storage unit 11, 12, 13 reads out the stored video signal for three times with the speed three times as fast as the input speed in synchronism with the vertical synchronizing signal V, so that the input color signals of one field are outputted to the signal switching device 5 repeatedly three times in a period of one field. The write operation and the read operation are performed in parallel.

The control device 16, when receiving the vertical synchronizing signal V and the rotational synchronization pulse P of the coloring unit 2, controls the rotation of the driving motor 3 so as to keep a predetermined phase relationship. Therefore, the coloring unit 2 is rotated once in a period of one field of the input video signals. The phase relationship is controlled in the same manner as in the prior art. The control device 16 controls also the signal switching device 5 to switch signals in accordance with an output from the frequency converting circuit 15. Accordingly, the signal switching device 5 outputs to the image display unit 1 a signal corresponding to the color filter 2a, 2b, 2c confronting to the display face 1a of the image display unit 1 among the input signals from the video signal storage units 11, 12, 13.

The relationship of the rotational phase of the coloring unit 2, a scanning line on the display face 1a of the image display unit 1 and the switching operation of the signal switching device 5 is the same as in the conventional example. More specifically, while the coloring unit 2 makes one rotation, a piece of a color image colored in three colors is obtained. In the present embodiment, however, the time required for the rotation of the coloring unit 2 and the display time of one field by the image display unit 1 are reduced to ⅓ the conventional apparatus. Accordingly, one piece of a color image can be displayed in a period of one field.

In the case where the input color signals R, G, B are interlaced signals and one frame is composed of two fields, namely R1, G1, B1 and R2, G2, B2, an image displayed on the display face 1a of the image display unit 1 is in the order of R1, G1, B1, R2, G2, B2, and therefore interlacing is necessary to be executed for every three fields. If the video signal storage units 11, 12, 13 are so constituted as to store the video signals with using the input vertical synchronizing signal V as a time reference, the output signal should be interlaced for every three fields.

When the video signal storage units 11, 12, 13 are adapted to store the video signals using the horizontal synchronizing signal H subsequent to the vertical synchronizing signal V as a time reference, and if the frequency converting circuit 15 is designed to generate an output earlier or later by half a cycle of the horizontal synchronizing signal H for every three pulses in synchronism with the interlacing of the input video signals, the interlacing process will be carried out in the same manner as above.

(Second Embodiment)

Figure 9:
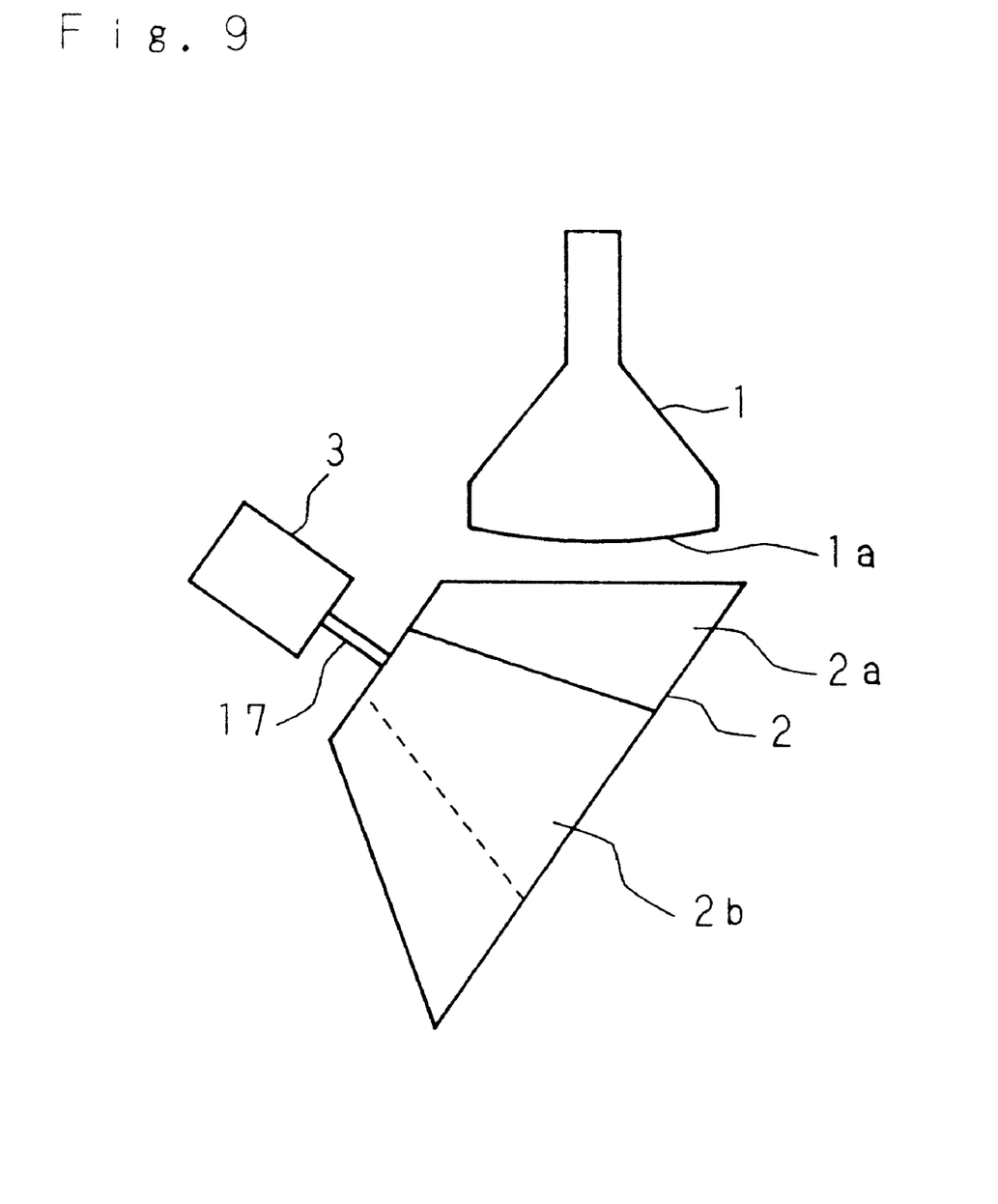
FIG. 9 is a side sectional view of a color image display apparatus according to a second embodiment of this invention.
Figure 10:
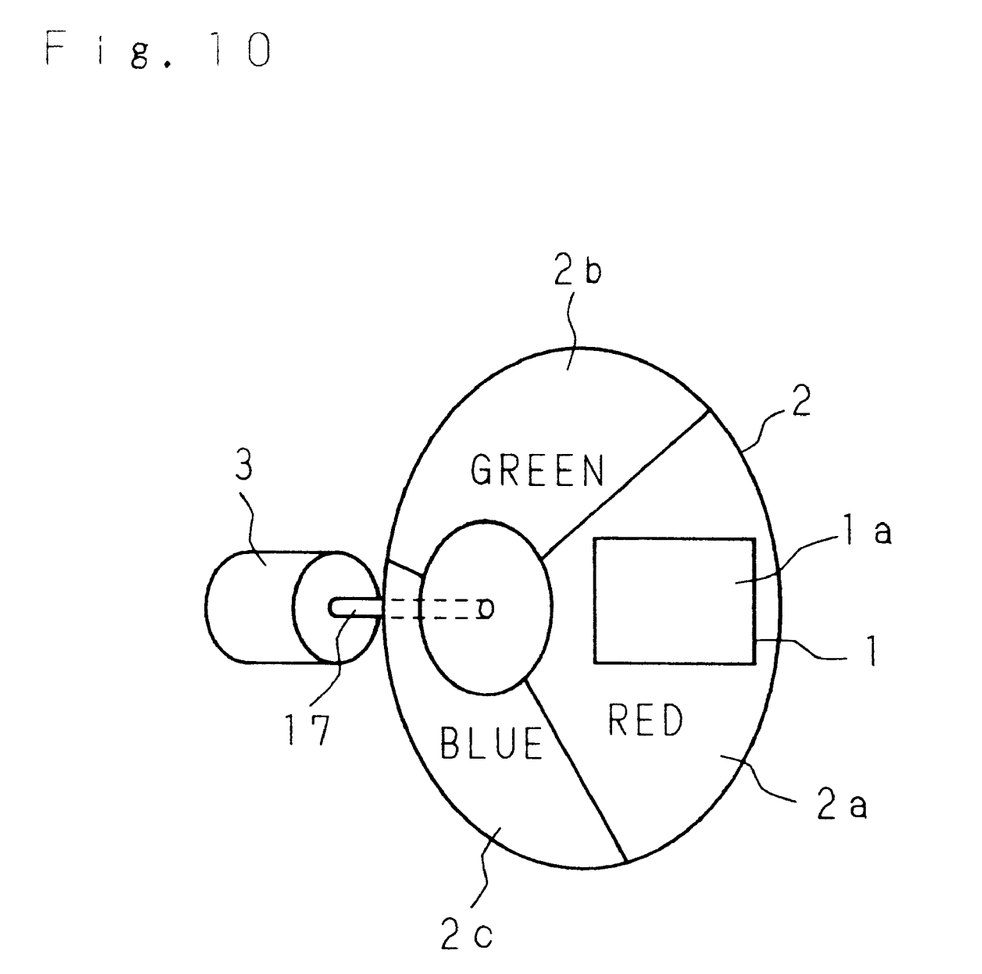
FIG. 10 is a perspective view of the color image display apparatus of FIG. 9.

According to the first embodiment described hereinabove, the coloring unit 2 is formed of a disk-shaped member with color filters 2a, 2b, 2c arranged radially. By contrast, it is possible to arrange the color filters 2a, 2b, 2c radially from the top of a circular cone as illustrated in FIGS. 9 and 10. According to this arrangement of a second embodiment, the coloring unit 2 can be made compact in size.

(Third Embodiment)

Figure 11:
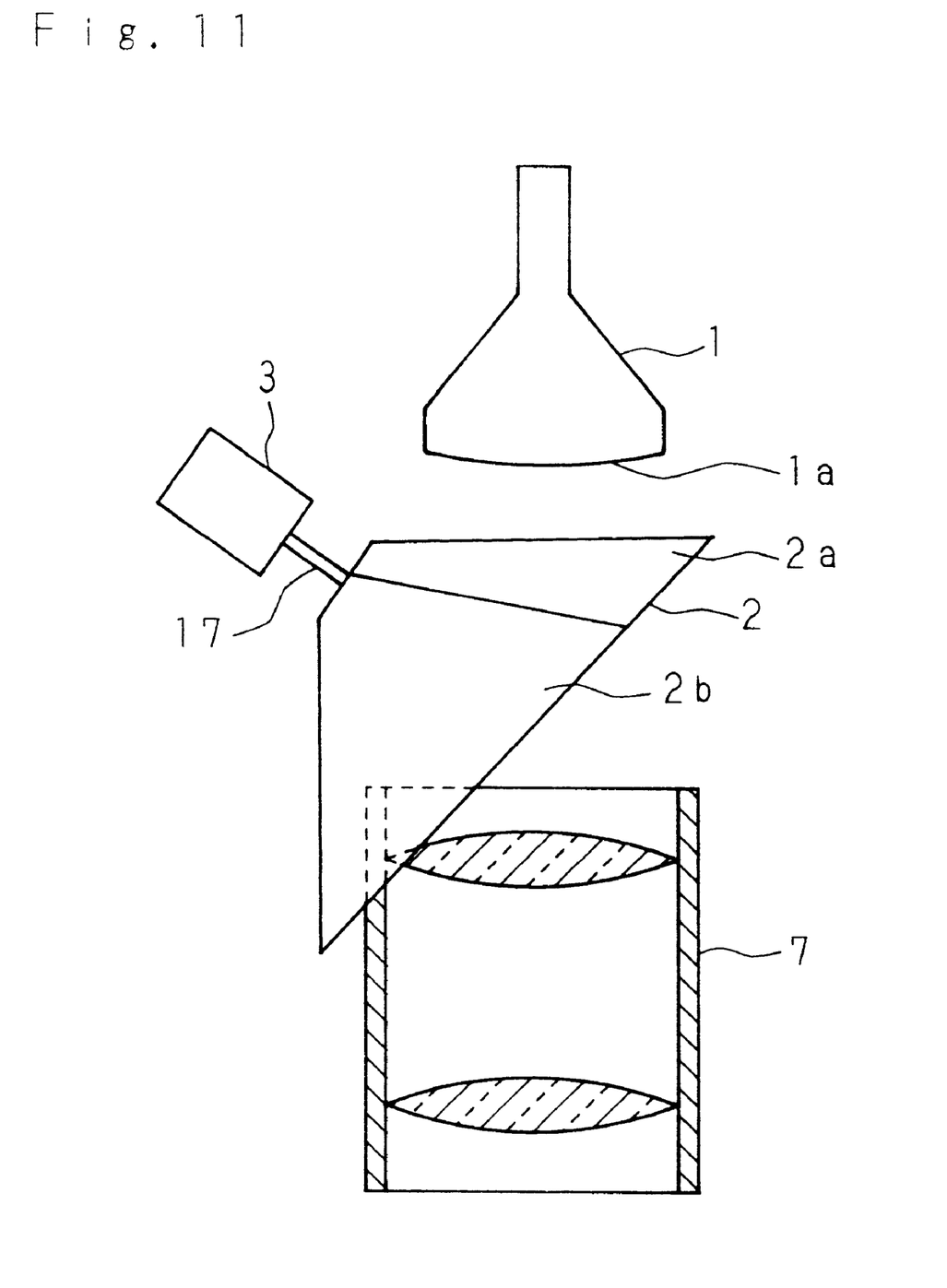
FIG. 11 is a side sectional view of a color image display apparatus according to a third embodiment of this invention.

Although the coloring unit 2 is provided in front of the image display unit 1 according to the foregoing first and second embodiments, a color image can be obtained also by providing a magnifying lens unit 7 in front of the coloring unit 2 and bringing the coloring unit 2 close to the magnifying lens unit 7, as is understood from FIG. 11. The color image display apparatus can be more miniaturized, which is utilized as a viewfinder of a video camera.

(Fourth Embodiment)

Figure 12:
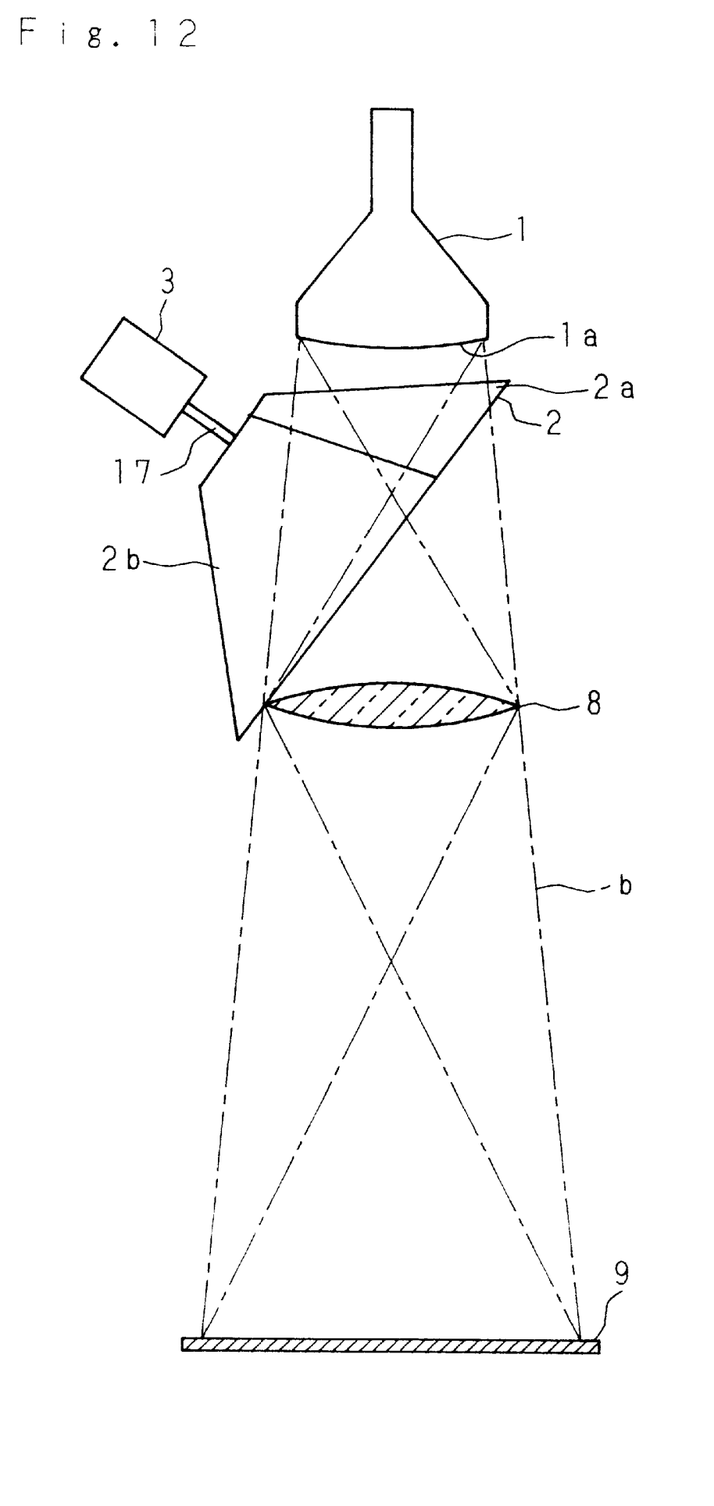
FIG. 12 is a side sectional view of a color image display apparatus according to a fourth embodiment of this invention.

In the first through third embodiments, the display face 1a of the image display unit 1 is seen through the coloring unit 2 directly or indirectly via the magnifying lens unit 7. According to the fourth embodiment, as shown in FIG. 12, a projecting lens unit 8 is placed in front of the coloring unit 2. A display light (b) from the image display unit 1 is projected by the projecting lens unit 8 to a screen 9 at a distance through the coloring unit 2, so that a color image is displayed on the screen 9. This embodiment is effective since a large color image can be obtained by one image display unit 1.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A color image display apparatus, comprising:

coloring means including a conical member with a plurality of color filters arranged radially;

monochrome image display means having a display face such that each of said plurality of color filters is sequentially positioned in front of said display face, said monochrome image display means being disposed facing an outer conical surface of said conical member;

a magnifying lens being disposed facing an inner conical surface of said conical member;

rotating means for rotating said coloring means to sequentially position each of said plurality of color filters in front of said display face;

a plurality of video signal storage means for receiving and storing a color video signal corresponding to each of said plurality of color filters;

signal switching means for selecting and outputting to said monochrome image display means, a field of a video signal which includes each of the color video signals stored in said plurality of video signal storage means corresponding to the plurality of color filters facing said coloring means;

wherein said plurality of color filters are red, green, and blue;

wherein the output rate of the color video signal from said plurality video signal storage means is three times the input rate thereof, and said monochrome image display means has a vertical scanning rate corresponding to the output rate of said plurality of video signal storage means;

wherein the color video signal input to each of said plurality of video signal storage means is an interlaced signal; and control means for controlling said monochrome image display means to perform interlacing in accordance with the interlaced signal corresponding to the selected one of said plurality of video signal storage means.

2. The color image display apparatus of claim 1, wherein said coloring means is a disk-shaped member having each color filter arranged radially.

3. The color image display apparatus of claim 1, wherein said rotating means is a motor for rotating said coloring means.

4. A color image display apparatus, comprising:

frequency converting means for receiving a synchronization signal and for increasing a frequency of the received synchronization signal;

color means including a conical member with a plurality of color filters arranged radially;

image display means including a display face wherein said image display means is a Braun tube with one gun for each beam, said image display means being disposed facing an outer conical surface of said conical member;

a magnifying lens being disposed facing an inner conical surface of said conical member;

positioning means for sequentially positioning one of the plurality of color filters in front of said display face of said image display means;

control means for generating a control signal based on a position of said plurality of color filters and said increased frequency synchronization signal;

a plurality of video signal storage means, each for storing a different color video signal, synchronized with the received synchronization signal; and signal switching means for receiving the control signal from said control means and gating a color image, including each of the different color video signals in one input signal field period and outputting the color image to said image display means;

wherein the plurality of color filters are red, green, and blue;

wherein an output rate of the different color video signals from said plurality of video signal storage means is three times an input rate thereof and said image display means has a vertical scanning rate corresponding to the output rate of said plurality of video signal storage means; and wherein the color video signal input to each of said plurality of video signal storage means is an interlaced signal.

5. The color image display apparatus of claim 4, further comprising control means for controlling said monochrome image display means to perform interlacing in accordance with the interlaced signal.

6. The color image display apparatus of claim 4, wherein said color means is a disk-shaped member having each color filter arranged radially.

7. The color image display apparatus of claim 4, wherein said positioning means is a motor for rotating said color means.

8. A color image display apparatus, comprising:

coloring means including a conical member with a plurality of color filters arranged radially;

monochrome image display means having a display face such that each of said plurality of color filters is sequentially positioned in front of said display face, said monochrome image display means being disposed facing an outer conical surface of said conical member;

a magnifying lens being disposed facing an inner conical surface of said conical member;

rotating means for rotating said coloring means to sequentially position each of said plurality of color filters in front of said display face;

a plurality of video signal storage means for receiving and storing a color video signal corresponding to each of said plurality of color filters; and signal switching means for selecting and outputting to said monochrome image display means, a field of a video signal which includes each of the color video signals stored in said plurality of video signal storage means corresponding to the plurality of color filters facing said coloring means.

* * * * *